(12) United States Patent
Benham et al.

(10) Patent No.: US 7,208,441 B2
(45) Date of Patent: Apr. 24, 2007

(54) POLYMERIZATION CATALYST SYSTEMS AND PROCESSES THEREFOR AND THEREWITH

(75) Inventors: Elizabeth A. Benham, Bartlesville, OK (US); Paul J. DesLauriers, Bartlesville, OK (US); Max P. McDaniel, Bartlesville, OK (US); Al R. Wolfe, Bartlesville, OK (US)

(73) Assignee: Chevron Philips Chemical Company LP, The Woodlands, TX (US)

( * ) Notice: Subject to any disclaimer, the term of this patent is extended or adjusted under 35 U.S.C. 154(b) by 23 days.

(21) Appl. No.: 10/997,727

(22) Filed: Nov. 23, 2004

(65) Prior Publication Data

US 2005/0288470 A1   Dec. 29, 2005

Related U.S. Application Data

(62) Division of application No. 10/321,801, filed on Dec. 16, 2002, now Pat. No. 6,875,835, which is a division of application No. 09/640,868, filed on Aug. 18, 2000, now Pat. No. 6,525,148.

(51) Int. Cl.
*B01J 27/188* (2006.01)
*B01J 31/14* (2006.01)
*C08F 4/52* (2006.01)
*C08F 4/69* (2006.01)

(52) U.S. Cl. .............. 502/210; 502/114; 502/118; 526/169; 526/153; 526/134; 526/139; 526/145

(58) Field of Classification Search ............ 502/118, 502/204, 114, 210, 208; 423/126; 526/138, 526/145, 169, 153, 134, 139
See application file for complete search history.

(56) References Cited

U.S. PATENT DOCUMENTS

| | | |
|---|---|---|
| 4,315,088 A | 2/1982 | Kitagawa et al. |
| 4,364,842 A | 12/1982 | McDaniel et al. |
| 4,364,854 A | 12/1982 | McDaniel et al. |
| 4,364,855 A | 12/1982 | McDaniel et al. |
| 4,397,765 A | 8/1983 | McDaniel |
| 4,424,341 A | 1/1984 | Hanson et al. |
| 4,444,962 A | 4/1984 | McDaniel et al. |
| 4,444,964 A | 4/1984 | McDaniel et al. |
| 4,444,965 A | 4/1984 | McDaniels et al. |
| 4,444,966 A | 4/1984 | McDaniel |
| 4,444,968 A | 4/1984 | McDaniel et al. |
| 4,501,885 A | 2/1985 | Sherk et al. |
| 4,504,638 A | 3/1985 | McDaniel et al. |
| 4,547,479 A | 10/1985 | Johnson et al. |
| 4,596,862 A * | 6/1986 | McDaniel et al. .......... 526/106 |
| 4,613,484 A | 9/1986 | Ayres et al. |
| 4,659,690 A * | 4/1987 | McDaniel et al. .......... 502/439 |
| 4,668,808 A | 5/1987 | Smith |
| 4,681,266 A * | 7/1987 | Mason et al. .................. 241/18 |
| 4,737,280 A | 4/1988 | Hanson |
| 4,806,513 A | 2/1989 | McDaniel et al. |
| 4,960,748 A | 10/1990 | Klendworth et al. |
| 5,010,152 A * | 4/1991 | McDaniel et al. .......... 526/106 |
| 5,037,911 A | 8/1991 | McDaniel et al. |
| 5,171,801 A | 12/1992 | Martin et al. |
| 5,221,720 A | 6/1993 | McDaniel et al. |
| 5,502,265 A | 3/1996 | Shveima |
| 5,908,679 A | 6/1999 | Berthold et al. |
| 6,111,037 A | 8/2000 | Auburn et al. |
| 6,465,586 B2 * | 10/2002 | McDaniel et al. .......... 526/129 |
| 6,525,148 B1 | 2/2003 | McDaniel et al. |

* cited by examiner

*Primary Examiner*—Ling-Sui Choi
*Assistant Examiner*—Rip A. Lee
(74) *Attorney, Agent, or Firm*—Conley Rose, P.C.; Rodney B. Carroll; Cheryl L. Huseman

(57) ABSTRACT

A copolymer of ethylene and a higher alpha olefin, preferably 1-hexene, can be produced using an activated chromium containing catalyst system and a cocatalyst selected from the group consisting of trialkylboron, trialkylsiloxyalutninum, and a combination of trialkylboron and thalkylaluminum compounds. The polymerization process must be carefully controlled to produce a copolymer resin having an exceptionally broad molecular weight distribution, extremely high PENT ESCR values, and a natural branch profile that impacts branching preferably into the high molecular weight portion of the polymer. The resulting copolymer resin is especially useful in high stiffness pipe applications.

28 Claims, 3 Drawing Sheets

POLYMERIZATION CATALYST SYSTEMS AND PROCESSES THEREFOR AND THEREWITH

CROSS-REFERENCE TO RELATED APPLICATIONS

This application is a divisional of U.S. patent application Ser. No. 10/321,801 filed Dec. 16, 2002, now U.S. Pat. No. 6,875,835, which is a divisional of U.S. patent application Ser. No. 09/640,868 filed Aug. 18, 2000, now U.S. Pat. No. 6,525,148, each of which is incorporated herein by reference in its entirety.

BACKGROUND OF THE INVENTION

This invention relates to the polymerization and copolymerization of a mono-1-olefin, such as ethylene, with a higher alpha-olefin comonomer, such as 1-hexene.

This invention also relates to polyolefin compositions, methods for producing polyolefin compositions, and to processes for using polyolefin compositions for producing pipe.

This invention further relates to producing cost-effective ethylene polymers and copolymers of exceptionally broad molecular weight distributions and increased environmental stress crack resistance (ESCR) values, especially useful for high stiffness pipe resin.

Supported chromium catalysts long have been a dominant factor in the production of high density olefin polymers, such as polyethylene. As originally commercialized, these catalyst systems were used in solution polymerization processes. However, it became evident early, that a more economical route to many commercial grades of olefin polymers was a slurry process, that is, a polymerization process carried out at a low enough temperature that the resulting polymer is largely insoluble in the diluent.

It is well known that mono-1-olefins, such as ethylene, can be polymerized with catalyst systems employing transition metals such as titanium, vanadium, chromium or other metals, either unsupported or on a support such as alumina, silica, aluminophosphate, titania, zirconia, magnesia and other refractory metals. Initially, such catalyst systems primarily were used to form homopolymers of ethylene. It soon developed, however, that comonomers such as propylene, 1-butene, 1-hexene, or other higher mono-1-olefins could be copolymerized with ethylene to provide resins tailored to specific end uses.

It is known in the art that when polymers of broad molecular weight distributions and improved physical properties such as environmental stress crack resistance (ESCR) or impact resistance are desired, chromium catalyst systems containing aluminophosphate supports can be employed. Polymers having a molecular weight distribution ($M_w/M_n$) of up to 30 can be obtained with aluminophosphate supported catalyst systems.

Aluminophosphate supports can be characterized by the amount of phosphate in the support, or more precisely, by the phosphorous to aluminum molar ratio (P/Al) of the composition. The P/Al molar ratio can vary from 0 for alumina ($Al_2O_3$), to 1 for stoichiometric aluminum phosphate ($AlPO_4$). At a phosphorus to aluminum molar ratio of 1, a crystalline solid of very little surface area and minimal pore volume is obtained, so that the activity from such catalyst systems having a P/Al molar ratio of 1 is minimal. Chromium supported on alumina also provides very low activity. Therefore, in practice, the commercially preferred molar ratio of phosphorus to aluminum in chromium/aluminophosphate catalyst systems ranges from slightly more than 0 to slightly less than 1.

It is also known that the activity of aluminophosphate supported catalyst systems increases with the amount of phosphate in the support, reaching a maximum at around a P/Al molar ratio of 0.7 to 0.9. Below a P/Al molar ratio of 0.3, the activity is considered too low to be practical. Unfortunately, it is at these lower P/Al molar ratios that the broadest molecular weight distributions, and thus the highest ESCR and impact resistance values are obtained. Another disadvantage of chromium/aluminophosphate catalyst systems is that they incorporate comonomers, such as 1-hexene, very poorly. In fact, 1-hexene can kill the activity of chromium/aluminophosphate catalyst systems. Thus, while chromium/aluminophosphate catalyst systems are excellent for producing very high density blow molding resins, they do not function well for producing lower density copolymers, such as for film and pipe.

SUMMARY OF THE INVENTION

It is therefore an object of this invention to provide a catalyst system composition useful for producing copolymers of exceptionally broad molecular weight distributions.

It is also an object of this invention to provide a process for producing polymers and copolymers having exceptional environmental stress crack resistance (ESCR) values, even at densities of 0.950 g/cc.

It is further an object of this invention to employ these copolymers in the production of a superior resin useful in the production of pipe.

It is still further an object of this invention to provide such a superior pipe.

In accordance with this invention, herein is provided a process comprising contacting in a reaction zone under polymerization conditions, at a temperature of less than about 110° C. in the presence of a hydrocarbon diluent:
(a) at least one mono-1-olefin;
(b) at least one mono-1-olefin co-monomer having from about 3 to about 8 carbon atoms per molecule;
(c) a catalyst system comprising a chromium source on an aluminophosphate support, wherein said support comprises a phosphorous to aluminum mole ratio of less than about 0.28, wherein said catalyst system is treated with less than about 7 weight percent fluoride, based on the weight of the support, and wherein said catalyst system is calcined at a temperature of less than about 700° C.; and
(d) a cocatalyst selected from the group consisting of trialkylboron, trialkylsiloxyaluminum, and combinations of trialkylboron and trialkylaluminum compounds;
wherein a polymer is recovered.

In accordance with another embodiment of this invention, herein is provided a composition produced by a process comprising contacting in a reaction zone under polymerization conditions, at a temperature of less than about 110° C. in the presence of a hydrocarbon diluent:
(a) at least one mono-1-olefin;
(b) at least one mono-1-olefin co-monomer having from about 3 to about 8 carbon atoms per molecule;
(c) a catalyst system comprising a chromium source on an aluminophosphate support, wherein said support comprises a phosphorous to aluminum mole ratio of less than about 0.28, wherein said catalyst system is treated with less than about 7 weight percent fluoride, based on the weight of the support, and wherein said catalyst system is calcined at a temperature of less than about 700° C.; and (d) a cocatalyst selected from the group consisting of trialkylboron, trialkylsiloxyaluminum, and combinations of trialkylboron and trialkylaluminum compounds;

wherein a polymer is recovered.

In accordance with another embodiment of this invention, herein is provided a composition comprising a copolymer of ethylene and a mono-1-olefin comonomer having from about 3 to about 8 carbon atoms per molecule, wherein said copolymer has a high load melt index (HLMI) within a range of about 2 to about 20 g/10 minutes, a density within a range of about 0.945 to about 0.955 g/cc, a molecular weight distribution ($M_w/M_n$) greater than about 50, a PENT environmental stress crack resistance (ESCR) value of greater than about 750 hours, and a branch profile of greater than about 1 SCB/1000 total carbons at 1 million molecular weight.

In accordance with yet another embodiment of this invention, herein is provided a composition comprising a copolymer of ethylene and 1-hexene, wherein said copolymer has a high load melt index (HLMI) within a range of about 3 to about 15 g/10 minutes, a density within a range of about 0.947 to about 0.953 g/cc, a molecular weight distribution ($M_w/M_n$) of greater than about 80, a PENT environmental stress crack resistance (ESCR) value of greater than about 1000 hours, and a branch profile of greater than about 1 branch/1000 carbons at 1 million molecular weight.

In accordance with yet another embodiment of this invention, herein is provided pipe produced from a composition comprising a copolymer of ethylene and a mono-1-olefin comonomer having from about 3 to about 8 carbon atoms per molecule, wherein said copolymer has a high load melt index (HLMI) within a range of about 2 to about 20 g/10 minutes, a density within a range of about 0.945 to about 0.955 g/cc, a molecular weight distribution ($M_w/M_n$) greater than about 50, a PENT environmental stress crack resistance (ESCR) value of greater than about 750 hours, and a branch profile of greater than about 1 branch/1000 carbons at 1 million molecular weight.

In accordance with yet another embodiment of this invention, herein is provided pipe produced by a process comprising contacting in a reaction zone under polymerization conditions, at a temperature of less than about 110° C. in the presence of a hydrocarbon diluent:

(a) at least one mono-1-olefin;
(b) at least one mono-1-olefin co-monomer having from about 3 to about 8 carbon atoms per molecule;
(c) a catalyst system comprising a chromium source on an aluminophosphate support, wherein said support comprises a phosphorous to aluminum mole ratio of less than about 0.28, wherein said catalyst is treated with less than about 7 weight percent fluoride, based on the weight of the support, and wherein said catalyst is calcined at a temperature of less than about 700° C.; and
(d) a cocatalyst selected from the group consisting of trialkylboron, trialkylsiloxyaluminum, and combinations of trialkylboron and trialkylaluminum compounds;

wherein a polymer is recovered.

In accordance with yet another embodiment of this invention, herein is provided a composition comprising aluminophosphate, wherein said alummophosphate comprises a phosphorus to aluminum mole ratio of less than about 0.28, wherein said composition is treated with less than about 7 weight percent fluoride and calcined at a temperature of less than about 700° C., and wherein said composition after calcination has a surface area of from about 300 to about 1000 square meters/g and a pore volume of greater than about 1.5 cc/g.

BRIEF DESCRIPTION OF THE DRAWINGS

The following is a brief description of the Figures.

DESCRIPTION OF THE PREFERRED EMBODIMENTS

Catalyst Systems

Figure 1:
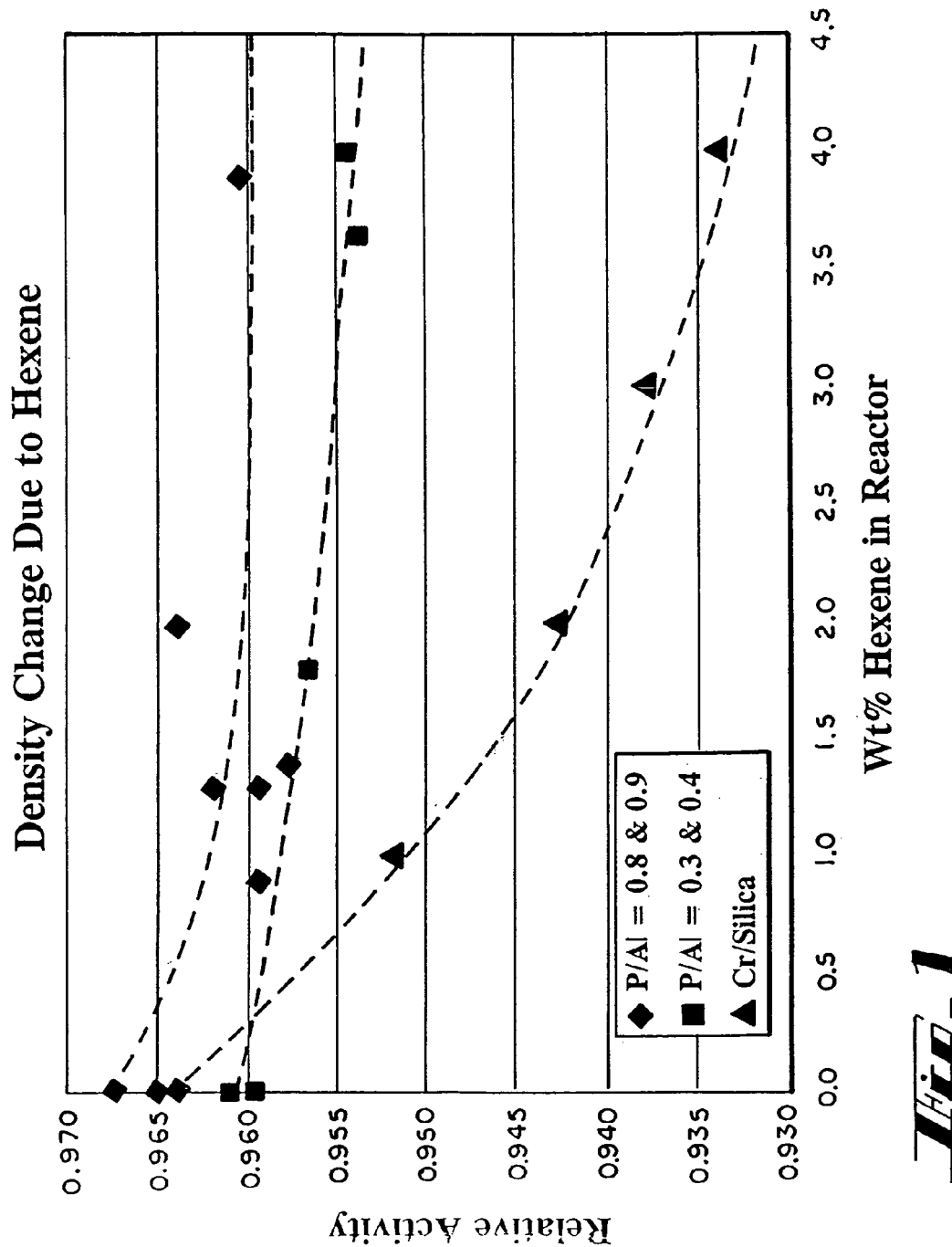
FIG. 1 is a graph of polymer density (g/cc) vs. weight percent 1-hexene in the reactor.

As used in this disclosure, the term "support" refers to a carrier for another catalytic component. However, by no means, is a support necessarily an inert material; it is possible that a support can contribute to catalytic activity and selectivity. Also, other components which do not adversely affect the catalyst systems or which are present to produce some unrelated results also can be present. The catalyst systems of this invention must be chromium on an aluminophosphate (also referred to as $AlPO_4$) support, or carrier.

Generally, aluminophosphate supports useful in this invention can be prepared by any method known to one in the art, such as, for example, use of a cogel. Particularly good examples of preparations can be found in U.S. Pat. Nos. 4,364,842, 4,444,965, 4,364,855, 4,504,638, 4,364,854, 4,444,964, 4,444,962, 4,444,966, and 4,397,765, the entirety of which are all incorporated herein by reference. Preferably, aluminophosphate supports are prepared from a cogel of an aluminum and phosphate compound. Such a cogel hydrogel can be produced by contacting aluminum and phosphorus compounds, usually with a small amount of water, and warming the mixture to at least about 40° C. (104° F.), or at a temperature sufficient to dissolve the mixture. By varying the amounts of aluminum and phosphorus added, the desired P/Al molar ratio can be achieved.

Generally, the P/Al molar ratio of aluminophosphate is within a range of from about 0.03 to about 0.28, preferably within a range of from about 0.1 to about 0.25, and most preferably within a range of from about 0.15 to about 0.250 for best catalyst system activity and productivity.

The aluminophosphate can be activated prior to use or inclusion in the catalyst system. The aluminophosphate can be activated at a temperature within a range of from about 200° C. (392° F.) to about 1000° C. (1832° F.), preferably within a range of from about 500° C. (932° F.) to about 800° C. (1472° F.), and most preferably within the range of 600° C. (1112° F.) to about 700° C. (1292° F.) for 3 to 4 hours.

The amount of aluminophosphate included in the catalyst system depends in part on the amounts and types of chromium compounds and cocatalysts employed. The determination of an effective amount of aluminophosphate for the desired purpose will not present difficulty in view of the present disclosure. It is contemplated that the preferred molar ratio of aluminum in $AlPO_4$ included in the catalyst system to metal, such as for example, chromium, in the catalyst system can be within a range of from about 10:1 to about 100,000:1, preferably from about 50:1 to about 10,000:1. Most preferably the molar ratio of aluminum in $AlPO_4$ included in the catalyst system to metal in the catalyst system is within a range of 100:1 to 5000:1.

The chromium component of the catalyst system comprises from about 0.1 to about 5 weight percent chromium, preferably from about 0.8 to about 1.5 weight percent, and most preferably from about 0.8 to about 1.5 weight percent chromium, based on the weight of the support. The chromium can be combined with the support component in any manner known in the art, such as by cogellation as described above, or by post-impregnation in which a chromium compound such as chromium (VI) trioxide, chromium (III) acetate, chromium (III) nitrate, and mixtures thereof can be dissolved into aqueous or alcoholic or other anhydrous solvents. Other chromium compounds known in the art also can be used. The solution then is impregnated onto the aluminophosphate carrier and evaporated to dryness.

Catalyst systems of this invention must be treated with a fluoriding agent. Generally, the fluoriding agent can be added to the support by forming a slurry of the support in a solution of the fluoriding agent and a suitable solvent such as alcohol or water. Particularly suitable solvents include, but are not limited to, alcohols containing from about one to about three carbon atom molecules due to their volatility and low surface tension. A suitable amount of the solution can be utilized to provide the desired concentration of fluoride on or in the support after drying. Drying can be effected by any method known in the art. For example, drying can be completed by suction filtration followed by evaporation, drying under a vacuum, or by spray drying.

Any organic or inorganic fluoriding agent which can form a surface fluoride with a support can be used in the invention. Suitable fluoriding agents include, but are not limited to, hydrofluoric acid (HF), ammonium fluoride ($NH_4F$), ammonium bifluoride ($NH_4HF_2$), ammonium fluoroborate ($NH_4BF_4$), ammonium silicofluoride (($NH_4$)$_2SiF_6$), ammonium fluorophosphate ($NH_4 PF_6$), ammonium hexafluorotitanate (($NH_4$)$_2TiF_6$), ammonium hexafluorozirconate, (($NH_4$)$_2ZrF_6$), and combinations thereof. The most preferred fluoriding agent is ammonium bifluoride due to ease of use and availability. The amount of fluoride deposited into or onto the support is generally within a range of from about 0.3 to about 7 weight percent fluorine (F), preferably from about 0.7 to about 4 weight percent fluorine, and most preferably, from about 1.3 to about 3 weight percent fluorine, based on the weight of the support.

Optionally, the support can be treated with a fluoriding agent during calcination. Any fluoriding agent capable of contacting the support during calcination can be used. In addition to the fluoriding agents as described above, organic fluoriding agents with high volatility can be especially useful. Organic fluoriding agents with high volatility are selected from the group consisting of freons, perfluorohexane, perfluorobenzene, fluoromethane, trifluoroethanol, and mixtures thereof. Gaseous hydrogen fluoride or fluorine itself can also be used. One convenient method of contacting the support is to vaporize a fluoriding agent into a gas stream used to fluidize the support during calcination.

The catalyst system, before, during, or after the fluoriding treatment, must be finally calcined by any method(s) known to one in the art to give a calcined catalyst system. Preferably, the catalyst system is calcined in an oxygen-containing ambient in any manner conventionally used in the art. The catalyst system can be calcined in any dry oxidizing gas, such as oxygen, nitrous oxide, air, mixtures of oxygen other inert gas or gases. Because of economy, the preferred oxygen-containing ambient is air, preferably dry air. Calcination temperatures generally are within a range of from about 400° C. (752° F.) to about 700° C. (1292° F.). Preferably, the calcination temperature is within a range of from about 500° C. (932° F.) to about 650° C. (1202° F.) and, most preferably, is within a range of from about 550° C. (1022° F.) to about 630° C. (1166° F.).

The time period for conducting calcination is generally within a range of from about 1 minute to about 100 hours. Preferably, calcination is conducted for a time period within a range of from about 1 hour to about 30 hours and, most preferably, within a range of from about 3 hours to about 10 hours. Under these calcination conditions, at least a substantial portion of any chromium in a lower valence state is converted to a hexavalent form.

After calcination, the catalyst system optionally can be cooled and subjected to at least a partial reduction of hexavalent chromium which may be present to a lower valence state. Preferably, a substantial portion of the chromium will be in the divalent state (Cr(II)) after the reduction process.

Any compound capable of reducing chromium(VI) to a lower valence state can be used as a reducing agent. Most preferably, the reducing agent is carbon monoxide, due to ready availability, ease of use, and safety. The reducing agent can be employed at temperatures within a range of from about 150° C. (752° F.) to about 600° C. (1112° F.). Preferably, the temperature is within a range of from about 200° C. (392° F.) to about 500° C. (932° F.) and most preferably, within a range of from about 300° C. (572° F.) to about 400° C. (752° F.). The partial pressure of the reducing gas in the reduction process can be varied from sub-atmospheric pressures to relatively high pressures, but the simplest reducing process is to utilize a dilute solution of a pure reducing agent at about atmospheric pressure. Usually, a solution of about 10%, by volume, carbon monoxide in an inert ambient, such as, for example, nitrogen and/or argon can be used.

The reduction time can vary from a few minutes to several hours or more. The extent of reduction can be followed by visual inspection of the catalyst system color. The color of the initial oxidized, activated catalyst system is generally orange, indicating the presence of hexavalent chromium. The color of the reduced catalyst system is typically blue, indicating that all, or substantially all, of the initial hexavalent chromium has been reduced to lower oxidation states, generally to the divalent state.

The course of reduction action of the oxidized, activated orange catalyst system with a reducing agent can be determined exactly by pulse titration. A known amount of reducing agent is added per mole of chromium and the amount of evolved oxidized reducing agent is measured. When reduction is complete, only reducing agent will be present and the catalyst system is blue or green in color. The reduced catalyst system can be titrated with pulses of oxygen or any oxidizing agent, to convert the catalyst system to the original orange color. When oxidation is complete, the oxidizing agent will be evident in the off-gas.

After reduction, the catalyst system can be cooled to about room temperature, e.g., about 25° C. (77° F.), in an inert atmosphere, such as argon or nitrogen, to flush out the reducing agent. After the flushing treatment, the catalyst system must be kept away from contact with either a reducing agent or an oxidizing agent.

In order to achieve the desired resultant effects on the resin product, or polymer, catalyst systems useful in this invention must be of high pore volume. After calcination, and optional reduction, catalyst systems useful in this invention must have a pore volume, as measured by BET nitrogen sorption, of at least about 1.5 cc/g, preferably at least about 1.8 cc/g, and most preferably at least about 2.2 cc/g to about 3 cc/g. Additionally, the catalyst system after calcination and optional reduction must have a high surface area, as measured by BET nitrogen sorption, usually within a range of from about 300 m$^2$/g to about 1000 m$^2$/g, preferably within a range of from about 400 m$^2$/g to about 800 m$^2$/g. Most preferably, the catalyst system surface area is within a range of from about 450 m$^2$/g to about 650 m$^2$/g.

Cocatalysts

Supported chromium catalyst systems, as described above, must be used with a cocatalyst. Cocatalysts useful in the present invention are selected from the group consisting of trialkylboron, trialkylsiloxyaluminum, and combinations of trialkylboron and trialkylaluminum compounds.

Examples of suitable trialkylboron compounds include those containing within a range of from about 1 to about 12 carbon atoms per alkyl group, preferably within a range of from about 2 to 5 carbon atoms per alkyl group. Such trialkylboron compounds are effective agents to improve polymer properties and also to increase catalyst activity during polymerization. Such trialkylboron compounds include, but are not limited to, trimethylborane, triethylborane (TEB), tri-n-butyl borane, tributylborane, tripropylborane and combinations thereof. Other suitable boron compounds include triarylboron compounds, such as for example triphenylborane and tribenzylborane. Preferably, the boron compound is a trialkylboron compound with the preferred trialkylboron compounds being triethylborane, tributylborane, and combinations thereof.

The concentration of cocatalyst useful in accordance with the present invention can be expressed in parts per million (ppm) based on the diluent used in the polymerization reactor. The weight percent of trialkylboron compounds useful as cocatalyst(s) in this invention usually are within a range of from about 0.1 ppm to about 20 ppm (mg/kg), based on the amount of diluent charged or weight of the diluent. Preferably, the weight percent is within a range of from about 0.5 ppm to about 15 ppm, more preferably within a range of from about 0.5 ppm to about 10 ppm, and most preferably within a range of from about 0.5 ppm to about 7 ppm, based on the amount or weight of the diluent.

In accordance with the present invention, the cocatalyst(s) can be a combination of trialkylboron and trialkylaluminum compounds. Examples of suitable aluminum compounds include, but are not limited to, those with the formula AlR'$_n$X$_{3-n}$ where X is a hydride or halide, R' is a hydrocarbyl radical having within a range of from about 1 to 12 carbon atoms per radical group, and n is an integer of 1 to 3. Such aluminum compounds include, but are not limited to, triethylaluminum (TEA) and diethylaluminum chloride (DEAC). Presently preferred aluminum compounds include trialkylaluminum compounds such as trimethylaluminum, triethylaluminum, tributylaluminum, and combinations thereof.

The combined cocatalyst concentration usually is within a range of from about 0.1 ppm to about 20 ppm (mg/kg), based on the amount of diluent charged or weight of the diluent. Preferably, the weight percent is within a range of from about 0.5 ppm to about 15 ppm, more preferably within a range of from about 0.5 ppm to about 10 ppm, and most preferably within a range of from about 0.5 ppm to about 7 ppm, based on the amount or weight of the diluent. One characteristic and advantage of combining cocatalysts in this invention is that catalyst system activity of the combined cocatalysts can be superior to that which could be obtained from an equal concentration of either cocatalyst alone. For example, a cocatalyst containing 4 ppm triethylboron and 4 ppm triethylaluminum gives superior activity compared with a cocatalyst containing 8 ppm triethylboron or a cocatalyst containing 8 ppm triethylaluminum.

Also, in accordance with the present invention, the cocatalyst can be trialkylsiloxyaluminum compounds. Examples of suitable trialkylsiloxyaluminum compounds include, but are not limited to, those with the formula R$_3$SiOAlR$_2$ where the R groups can be the same or different and have in the range of from about 1 to 12 carbon atoms per alkyl group. Such trialkylsiloxyaluminum compounds include, but are not limited to, triethylsiloxyaluminum diethyl, trimethylsiloxyaluminum diethyl, tripropylsiloxyaluminum dimethyl, and combinations thereof. Presently preferred trialkylsiloxyaluminum compounds include, but are not limited to, triethylsiloxyaluminum diethyl.

The amount of trialkylsiloxyaluminum compound used is generally within a range of about 0.1 ppm to about 20 ppm(mg/kg), based on the amount of diluent charged or weight of the diluent. Preferably, the weight percent is within a range of from about 0.5 ppm to about 15 ppm, more preferably within a range of from about 0.5 ppm to about 10 ppm, and most preferably within a range of from about 0.5 ppm to about 7 ppm, based on the amount or weight of the diluent.

Reactants

Catalyst systems of this invention can be used to polymerize at least one mono-1-olefin containing within a range of from about 2 to about 20 carbon atoms per molecule. Suitable mono-1-olefins include, but are not limited to, ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof. When the desired polymerization product is a homopolymer, it is preferred to use ethylene, or propylene as the monomer. If the reaction product is a copolymer, at least one mono-1-olefin can be polymerized with a different mono-1-olefin comonomer, wherein said comonomer comprises from about 3 to about 10 carbon atoms per molecule, preferably from about 3 to about 8 carbon atoms per molecule. Suitable comonomers include, but are not limited to, propylene, 1-butene, butadiene, 1-pentene, 1-hexene, 1-octene, 4-methyl-1-pentene, and mixtures thereof. Preferably, when the desired polymerization product is a copolymer, if the monomer is ethylene, the comonomer is 1-hexene and/or 4-methyl-1-pentene, in order to achieve maximum polymer product toughness. Preferably, if the monomer is propylene, the comonomer is ethylene and/or butadiene in order to achieve maximum polymer product toughness and clarity.

A comonomer can be added to the polymerization reactor, or reactor zone, in an amount within a range of from about 1 to about 20 weight percent, preferably within a range of from about 7 to about 18 weight percent, based on the weight of the monomer. Most preferably, a comonomer is present in the reaction zone within a range of from about 10 to about 16 weight percent, based on the weight of the monomer, in order to produce a polymer having the most desired physical properties. By varying the monomer to comonomer ratio in the reactor, the density of the polymer can be controlled. Also, the molecular weight of the polymer can be controlled by various means known in the art such as, for example, adjusting the temperature, introducing, or varying the amount of hydrogen present, or varying the catalyst system compounds.

Polymerization

Polymerization can be carried out in any manner known in the art, such as gas phase, solution, multi-reactor, or slurry polymerization conditions. A stirred reactor can be utilized for a batch process, or the reaction can be carried out continuously in a loop reactor or in a continuous stirred reactor. A preferred polymerization technique is that which is referred to as particle-form, or slurry, polymerization conditions. Under such conditions, the temperature is kept below the temperature at which a polymer swells or goes into solution. Slurry polymerization processes can be much easier to operate and maintain than other polymerization processes, in that a polymer product produced by a slurry process can be recovered much more easily. Such polymerization techniques are well-known in the art and are disclosed, for instance, in Norwood, U.S. Pat. No. 3,248,179, the disclosure of which is incorporated herein by reference.

Two preferred polymerization techniques for the slurry process are those employing a loop reactor of the type disclosed in Norwood and those utilizing a plurality of stirred reactors either in series, parallel or combinations thereof wherein the reaction conditions can be different in the different reactors.

The slurry process generally is carved out in an inert diluent (medium), such as, for example, a paraffin, cycloparaffin, and/or aromatic hydrocarbon. Preferably, the inert diluent is an alkane having less that about 12 carbon atoms per molecule, for best reactor operation and polymer product. Exemplary diluents include, but are not limited to, propane, n-butane, isobutane, n-pentane, 2-methylbutane (isopentane), and mixtures thereof. Isobutane is the most preferred diluent due to low cost and ease of use. Examples of the use of isobutane as a diluent in slurry polymerization processes can be found in U.S. Pat. Nos. 4,421,341; 4,501,885; 4,613,484; 4,737,280; and 5,597,892, the entirety of which are all incorporated herein by reference. These techniques enable the efficient polymerization of ethylene, for example, ethylene and a different mono-1-olefin, or propylene.

The temperature of the polymerization reactor, or reaction zone, is usually within a range of from about 85° C. (185° F.) to about 110° C. (212° F.), although higher or lower temperatures can be used. Preferably, the temperature is within a range of from about 90° C. (194° F.) to about 107° C. (225° F.). Most preferably, the temperature is within a range of from about 95° C. (203° F.) to about 105° C. (221° F.).

Pressures in the slurry process can vary from about 100 to about 1000 psia (0.76–7.6 MPa), preferably in the range of from about 200 to about 700 psia. Most preferably, the reaction zone is maintained at a pressure within a range of from about 300 to about 600 psia for best reactor operating parameters and best resultant polymer product. The catalyst system is kept in suspension and is contacted with the monomer and comonomer(s) at a sufficient pressure to maintain the medium and at least a portion of the monomer and comonomer(s) in the liquid phase. The diluent and temperature thus are selected so that the polymer or copolymer can be produced as solid particles and recovered in that form. Catalyst system concentrations in the reactor can be such that the catalyst system content ranges from about 0.001 to about 1 weight percent based on the weight of the total reactor contents.

Polymer Description

Polymers produced in accordance with this invention can be homopolymers of at least one mono-1-olefin, such as ethylene, and copolymers of mono-1-olefins, such as ethylene and different mono-1-olefin comonomers, such as 1-hexene. Polymers produced according to this invention much more easily can be processed than polymers produced in accordance with different polymerization processes. Additionally, the polymers produced according to this invention can have extremely broad molecular weight distributions and can have excellent characteristics for high stiffness pipe applications.

The high load melt index (HLMI) of polymers produced in accordance with this invention usually is within a range of from about 2 g/10 minutes to about 20 g/10 minutes, preferably within a range of from about 3 g/10 minutes to about 15 g/10 minutes. Most preferably, the HLMI of the polymer product is within a range of about 5 g/10 minutes to about 10 g/10 minutes.

Polymers produced in accordance with this invention have a broad molecular weight distribution as evidenced by polydispersity, or weight average molecular weight divided by number average molecular weight ($M_w/M_n$). Usually the $M_w/M_n$ ratio for polymers produced in accordance with this invention is at least about 50, preferably greater than about 80, and more preferably greater than about 100. Most preferably, the $M_w/M_n$ ratio is greater than about 140 with an upper limit of about 500. The polymers of this invention also have a very narrow density range, usually within a range of from about 0.945 g/cc to about 0.955 g/cc. Preferably, the density is within a range of from about 0.947 g/cc to about 0.953 g/cc and, most preferably, the polymer has a density within a range of from about 0.948 g/cc to about 0.952 g/cc.

Polymers produced in accordance with this invention also have high PENT environmental stress crack resistance (ESCR) values. Generally, the polymer has a PENT ESCR value of greater than about 750 hours, preferably greater than about 1000 hours and, more preferably, greater than about 1500 hours. Most preferably, the PENT ESCR value is greater than about 1800 hours. Exceeding most preferably, the PENT ESCR value is greater than about 2000 hours. While not wishing to be bound by theory, it is believed that some inventive polymers, when formed into pipe, will not fail within a reasonable time.

Polymers produced in accordance with this invention also have a unique branch distribution with a flat or rising profile with increasing molecular weight. In general, the branch distribution is characterized by having a high concentration of branching in a molecular weight range of greater than one million. As used in this disclosure, the term "SCB/1000 total carbons" refers to short chain branches per one thousand total carbon atoms. The term "SCB/1000 total carbons" also is synonomous with the term "B/1000 carbons" which refers to branch per one thousand carbon atoms. Polymers produced in accordance with this invention generally have greater than about 0.5 short chain branches per thousand total carbons (SCB/1000 total carbons) at one million molecular weight (MW), preferably greater than about 1 SCB/1000 total carbons at one million molecular weight (MW). Most preferably, the polymer product has greater than about 1.5 SCB/1000 total carbons at one million molecular weight (MW).

Polymers produced in accordance with this invention also are characterized by having a high concentration of branching in the molecular weight range of greater than ten million. Polymers produced in accordance with this invention generally have greater than about 0.5 short chain branches per thousand total carbons (SCB/1000 total carbons) at ten million molecular weight (MW), preferably greater than about 1 SCB/1000 total carbons at ten million molecular weight (MW). Most preferably, polymers produced in accordance with this invention have greater than about 1.5 SCB/1000 total carbons at ten million MW.

The following examples are presented to further illustrate the invention and are not to be construed as unduly limiting the scope of the invention.

EXAMPLES

Data are included in the examples about catalyst system preparation, polymerization conditions, as well as the resultant polymers. All chemical handling, including reactions, preparations and storage, was performed under a dry, inert atmosphere (usually nitrogen), unless otherwise indicated.

Polymerization Processes

Polymerization runs for these examples were conducted using both a bench scale reactor and a loop reactor. Bench scale polymerizations were carried out in a 2.2 liter, stirred autoclave reactor equipped with a steel jacket for precise temperature control. Unless otherwise stated, a small amount (usually 0.01 to about 0.10 grams) of solid chromium containing catalyst was first charged under nitrogen to the dry reactor. Next, 1.2 liters of isobutene liquid was charged and the reactor was heated up to the specified temperature, usually around 95° C. (203° F.). When a cocatalyst was used, such as triethylboron (TEB) or triethylaluminum (TEA), a small amount (usually 1–2 mL) of a solution containing 1 weight percent of the cocatalyst diluted in heptane was added midway during the isobutane addition. Finally, ethylene was added to the reactor to bring the total reactor pressure to 550 pounds per square inch gauge (psig), which was maintained during the polymerization run. Stirring was continued for a specified time, usually around 1 hour, with the catalyst system activity being noted by recording the amount of ethylene flowing into the reactor required to maintain the set pressure. After the specified time, ethylene flow was discontinued and the reactor was allowed to depressurize and subsequently was opened to recover a granular polymer powder. In all cases, the reactor was clean with no indication of any wall scale, coating, or other forms of fouling. The polymer powder was removed and weighed. Activity was specified as grams of polymer produced per gram of solid catalyst charged per hour.

Polymerization runs were also carved out under continuous particle form process conditions in a loop reactor (also known as a slurry process) by contacting a chromium containing solid catalyst system with ethylene and sometimes 1-hexene as indicated. Ethylene used was polymerization grade ethylene (obtained from Union Carbide Corporation) which was purified through a column of alumina and activated at 250° C. (482° F.) in nitrogen. 1-Hexene, when used, was polymerization grade 1-hexene (obtained from Chevron Chemicals Company) which was purified by nitrogen purging and storage over 13× molecular sieve activated at 250° C. (482° F.) in nitrogen. The loop reactor was a liquid full, 15.2 cm diameter, loop reactor, having a volume of 23 gallons (87 liters). Liquid isobutane was used as the diluent, and occasionally some hydrogen was added to regulate the molecular weight of the polymer product. The isobutane was polymerization grade isobutane (obtained from Phillips Petroleum Company, Borger, Tex.) which was further purified by distillation and subsequently passed through a column of alumina and activated at 250° C. (482° F.) in nitrogen.

Reactor conditions included a pressure around 580 psi (4 MPa), and a temperature that was varied from about 65° C. (149° F.) to about 110° C. (230° F.) as indicated in the examples below. Also, the reactor was operated to have a residence time of 1.25 hours. The catalyst systems were added through a 0.35 cc circulating ball-check feeder. Catalyst system concentrations in the reactor were within a range of from about 0.001 to about 1 weight percent based on the weight of the total reactor contents. Polymer was removed from the reactor at the rate of about 25 lbs per hour and recovered in a flash chamber. A Vulcan dryer was used to dry the polymer under nitrogen at about 60–80° C. (140–176° F.).

Cocatalysts such as triethylaluminum (TEA) and triethylboron (TEB) (obtained from Akzo Corporation) were also used. These cocatalysts were obtained as one molar solutions in heptane, but were further diluted to 1 weight percent. The cocatalysts were added as indicated in a concentration in a range of from about 1 to about 30 parts per million of the diluent in the polymerization reactor(s). To prevent static buildup of the reactor, a small amount (less than 5 ppm, by weight, of diluent) of a commercial antistatic agent sold as "Stadis 450" was usually added.

Example I

This example illustrates the preparation of various catalyst systems used in the following Examples.

Chromium/Aluminophosphate Catalyst Systems

Aluminophosphate catalyst systems were prepared from a concentrated syrup containing aluminum nitrate nonahydrate, ammonium phosphate monobasic, and chromium nitrate. A small amount of water was added, usually about the same amount as the aluminum nitrate, and was warmed to about 40° C. (104° F.) to dissolve the mixture. The aluminum nitrate and aluminum phosphate monobasic were added in an amount needed to yield the desired phosphorus to aluminum mole ratio (P/Al). For example, to achieve a phosphorus to aluminum mole ratio (P/Al) of 0.2 in the final catalyst system, 0.2 moles of ammonium phosphate monobasic were added for each mole of aluminum nitrate nonahydrate. Chromium nitrate was added in an amount needed to yield 1 weight percent chromium on the final product. To this syrup then was added, with rapid and vigorous stirring, concentrated ammonium hydroxide to form a gel with a pH around 5–7. This gel was broken up and slurried in water to which more ammonium hydroxide was added to adjust the pH to about 8–9. At this pH, the slurry was heated to 60° C. (140° F.)–80° C. (176° F.) for about 1 hour, where it was aged. The slurry was then filtered, washed in about five times its volume in water, and filtered again. This process was repeated three times. The filtrate was given a final wash in n-propanol, filtered again, and dried at 110° C. (230° F.) under half an atmosphere of vacuum for 12 hours. The dried catalyst system was then pushed through a 35 mesh screen containing a 0.50 mm opening.

Some catalyst systems also were treated with fluoride by dissolving the desired amount of ammonium bifluoride in methanol. This solution was adjusted so that the resulting impregnated catalyst systems would come to the point of incipient wetness, and the solution then was impregnated onto or into the catalyst systems. The resultant damp powder then was dried again under half an atmosphere of vacuum at 110° C. (230° F.) for 12 hours.

Other Catalyst Systems

Other polymerization catalyst systems were used in the following examples and were loaded with about 1 weight percent chromium, unless otherwise indicated. 963 Magnapore®, 965 Sylopore®, and 969 MS are three polymerization catalyst systems that were used and are commercially available from Davison Chemical Company, a divisional of W. R. Grace & Co. 963 Magnapore®, a high porosity silica-titania catalyst system, was prepared in accordance with U.S. Pat. No. 3,887,494, the entirety of which is incorporated herein by reference. 963 Magnapore® contained 2.5 weight percent titanium, possessed a surface area of about 550 m$^2$/g, and a pore volume of about 2.2 to about 2.5 cc/g. 965 Sylopore®, a lower porosity silica-titania catalyst system, was prepared in accordance with U.S. Pat. No. 4,981,83, the entirety of which is incorporated herein by reference. 965 Sylopore® contained 2.5 weight percent titanium, possessed a surface area of about 380 m$^2$/g, and a pore volume of about 0.9 cc/g. 969MS, a silica supported catalyst system possessed a surface area of about 300 m$^2$/g and a pore volume of 1.6 cc/g.

Activation of Catalyst Systems

On the bench scale reactor, described above, catalyst systems were activated by placing about 10 grams of the catalyst system in a 1.75 inch quartz tube fitted with a sintered quartz disk at the bottom. While catalyst systems were supported on the disk, dry air was blown up through the disk at the linear rate of about 1.6 to 1.8 standard cubic feet per hour. An electric furnace around the quartz tube was then turned on and the temperature was increased at the rate of 400° C. (752° F.) per hour to the desired temperature, such as, for example, 600° C. (1112° F.). The catalyst system was then collected and stored under dry nitrogen, where it was protected from the atmosphere until tested.

For the 23 gallon loop reactor, larger quantities of catalyst systems similarly were activated. The catalyst systems were activated by charging 1.5 pounds of catalyst system into a six inch diameter stainless steel furnace which was itself heated by electric coils surrounding the furnace. Dry air was allowed to rise up through a centered metal grid plate at the rate of about 0.12 to about 0.20 linear feet per second to fluid out of the catalyst system. The catalyst system then was heated up to the desired temperature over a period of about 5 hours. It was held at that specified temperature for another 6 hours, and cooled down to room temperature and stored under dry nitrogen until tested. About 65 to 85 percent of the catalyst system weight charged was recovered, the lost weight being water and very fine material.

In some cases, catalyst systems were treated with carbon monoxide before being discharged from the reactor and stored under nitrogen. This was done in order to reduce at least some of the hexavalent chromium to a divalent state, which can increase 1-hexene incorporation efficiency, as described in *Polymer Engineering and Science* (SPE), Vol. 28, No. 22, pp. 1469–1472 (1988). This was accomplished by fluidizing the catalyst systems in carbon monoxide at about 350° C. (700° F.) for about 2 hours after the calcination step. The carbon monoxide can be used pure or diluted with up to 90 percent nitrogen. Bench scale activations usually used pure carbon monoxide for convenience, while the 23 gallon loop reactor used 10 percent carbon monoxide. After carbon monoxide treatment, catalyst systems were flushed clean with nitrogen for about 1 hour, cooled in nitrogen, and then stored. The color of reduced catalyst systems was usually blue or green, indicating that all, or substantially all, of the initial hexavalent chromium had been reduced to a lower oxidation state, generally the divalent state.

Analysis of the resultant polymers were conducted according to the following procedures.

Polymer density was determined in grams per cubic centimeter (g/cc) on a compression molded sample, cooled at about 15° C. (59° F.) per hour, and conditioned at room temperature for about 40 hours in accordance with ASTM D1505-68 and ASTM D1928, condition C.

High load melt index (HLMI) was determined in grams of polymer per 10 minutes (g/10 min) in accordance with ASTM D1238, Condition 190/2.16, at 190° C. (374° F.) with a 21,600 gram weight.

Melt Index (MI) was determined in grams of polymer per ten minutes in accordance with ASTM D1238, condition 190/2, at 190° C. (374° F.) with a 2,160 gram weight.

Typical molecular weights and molecular weight distributions were obtained using a Waters 150 CV size exclusion chromatograph (SEC) with trichlorobenzene (TCB) as the solvent, with a flow rate of 1 mL/minute at a temperature of 140° C. (284° F.). BHT (2,6-di-tert-butyl-4-methylphenol) at a concentration of 1.0 g/L was used as a stabilizer in the TCB. An injection volume of 220 L was used with a polymer concentration of 1.4 mg/L (at room temperature). Dissolution of the sample in stabilized TCB was carried out by heating at 160–170° C. (320–338° F.) for 4 hours with occasional, gentle agitation. The column was two Waters HMW-6E columns (7.8×300 mm) and were calibrated with a broad linear polyethylene standard (Phillips Marlex® BHB 5003) for which the molecular weight had been determined. As a measure of volatile oligomeric components, or smoke, the amount of material found in the range of molecular weights from 100 to 1000 were listed.

A "Quantachrome Autosorb-6 Nitrogen Pore Size Distribution Instrument" was used to determine the surface area and pore volume of the supports. This instrument was acquired from the Quantachrome Corporation, Syosset, N.Y.

Environmental Stress Crack Resistance (ESCR, hrs) was determined according to ASTM D1693, Condition A.

PENT environmental stress crack resistance values were obtained at 80° C. (176° F.) according to ASTM F1473 (1997).

SEC-FTIR Branch Determination as a function of the molecular weight distribution was obtained as follows. For molecular weight detemminations, a Polymer Laboratories model, 210 GPC equipped with two Styragel HT 6E columns (Waters), was used. Resin samples were dissolved in trichlorobenzene (TCB) containing 0.034 weight percent butalatedhydroxytoluene (BHT) by heating the mixture for 1 hour at 155° C. (311° F.) in a Blue M air convection oven. Resin samples of about 1.8 mg/mL were chromatographed at 1 mL/min using TCB as the mobile, at a sample injection volume of 500 μL. The samples were introduced to a Perkin Elmer Model 2000 FTIR spectrophotometer equipped with a narrow band mercury cadmium telluride (MCT) detector via a heated transfer line and flow cell (KBr windows, 1 mm optical path, and about 70 μL cell volume). The temperatures of the transfer line and flow cell were kept at 143+/−1° C. (290+/−1° F.) and 140+/−1° C. (284+/−1° F.), respectively.

Background spectra were obtained on the polymer free, solvent filled cell. All of the IR spectra were measured at 8 cm$^{-1}$ resolutions (16 scans).

Chromatograms were generated using the root mean square (rms) absorbance over the 3000–2700 cm$^{-1}$ spectral region and molecular weight calculations were made using a broad molecular weight PE standard. Spectra from individual time slices of the chromatogram were subsequently analyzed for co-monomer branch levels using the Chemometric techniques described below.

Narrow molecular weight distribution samples ($M_w/M_n$) of about 1.1 to about 1.3, solvent gradient fractions of ethylene 1-butene, ethylene 1-hexene, ethylene 1-octene copolymers, and polyethylene homopolymers were used in calibration and verification studies. Low molecular weight alkanes were also used. The total methyl content of these samples contained from about 1.4 to about 83.3 methyl groups per 1000 total carbon molecules. The methyl content of the samples was calculated from $M_n$ (number average molecular weight) or was measured using C-13 NMR spectroscopy. C-13 NMR spectra were obtained on 15 weight percent samples in TCB using a 500 MHZ Varian Unity Spectrometer at 125° C. (257° F.) as described in J. C. Randall and E. T. Hseish; *NMR and Macromolecules; Sequence, Dynamic, and Domain Structure*, ACS Symposium Series 247, J. C. Randall, Ed., American Chemical Society, Washington D.C., 1984. Methyl content per 1000 carbon molecules by NMR was obtained by multiplying the ratio of branching signals to total signal intensity by 1000.

A calibration curve was generated using Pirovette Chemometric software to correlate changes in the FTIR absorption spectra with calculated or NMR measured values for number of methyl groups per 1000 carbon molecules for the samples. The calibration results were obtained for the spectral region of 3000 cm$^{-1}$ and 2700 cm$^{-1}$ to avoid the solvent interference in quantitative results for prediction of the measured sample spectrum. Preprocessing of the spectral data included smoothing of 9 data points, baseline correction, and normalization. Further preprocessing of the spectral data entailed taking the first derivative of the spectra and mean centering all the data. A four component calibration model was calculated and optimized using the process of cross validation (RSQ=0.999, SEV=0.7). The calibration model was verified using 13 additional samples. The predicted versus actual values for the validation data showed excellent correlation (RSQ=0.987) and exhibited a root mean square error of prediction equal to +/−0.4 methyl groups per 1000 total carbon molecules.

Short chain branching levels were calculated by subtracting out methyl chain end contributions. The amount of methyl chain ends were calculated using the equation $Me_{ce}=C(2-V_{ce})/M$, where $Me_{ce}$ is the number of methyl chain ends per 1000 total carbon molecules, C is a constant equal to 14000, $V_{ce}$ is the number of vinyl terminated chain ends (1 for chromium catalyzed resins), and M is the molecular weight calculated for a particular slice of the molecular weight distribution.

Example I

This example illustrates the traditional difficulties experienced in the art in using chromium/aluminophosphate catalyst systems. Table I compares the activity response of the chromium/aluminophosphate catalyst systems when the phosphorus to aluminum (P/Al) mole ratio and activation temperature were varied. The chromium/aluminophosphate catalyst systems were obtained from a bench reactor operating at 95° C. (203° F.) with 4 ppm triethylboron (TEB) and 550 psig ethylene.

TABLE I

Activity response of various chromium/aluminophosphate catalyst systems (g pol/g cat/hr) to various P/Al molar ratios and activation temperatures

| P/Al molar ratio | Catalyst System Activity at Different Activation Temperatures | | |
|---|---|---|---|
| | 300° C. | 500° C. | 700° C. |
| 0.0 | 0 | 555 | 1340 |
| 0.2 | 1085 | 1685 | 2295 |
| 0.4 | 2000 | 4790 | 5400 |
| 0.6 | 1970 | 6395 | 6300 |
| 0.8 | 2910 | 4444 | 4235 |
| 0.95 | 2500 | 3565 | 3770 |
| 1.0 | 0 | 0 | 700 |

As shown in Table I, the highest activity catalyst systems were achieved with both high P/Al molar ratios and high activation temperatures. Catalyst systems run at low P/Al molar ratios and low activation temperatures generally yielded poor or unacceptable activity. However, it is at these low P/Al molar ratios and low activation temperatures where the broadest molecular weight distributions (MWD) are found and thus more desirable polymer properties.

Example II

This example compares the environmental stress crack resistance (ESCR) values of polymers obtained from the loop reactor using chromium/aluminophosphate catalyst systems of varying P/Al molar ratios. The polymers (homopolymers) of this example were obtained from a 23 gallon loop reactor operating between about 93° C. (200° F.) to about 99° C. (210° F.) with 0.5 to 1 ppm triethylboron. The catalyst systems were activated at 600° C. (1112° F.) and the polymers obtained had melt index (MI) values of 0.15 to 0.35 g/10 minutes. As shown in Table II, the highest ESCR values are obtained at low P/Al molar ratios.

TABLE II

Environmental Stress Crack Resistance (ESCR) values of polymers varying P/Al molar ratios

| P/Al | 0 | 0.2 | 0.3 | 0.37 | 0.4 | 0.5 | 0.55 | 0.6 | 0.8 | 0.9 |
|---|---|---|---|---|---|---|---|---|---|---|
| ESCR, (hrs) | >100 | >100 | 525 | 300 | 240 | 150 | 95 | 100 | 24 | 0 |

Example III

This example illustrates another problem associated with chromium/aluminophosphate catalyst systems and the response to 1-hexene or other comonomers. Usually, commercial chromium catalyst systems (chromium/silica) incorporate 1-hexene well to easily produce ethylene/1-hexene copolymers. The addition of 1-hexene in an amount equal to about 4 percent of the liquid diluent is usually sufficient to cover the entire copolymer range, from densities of 0.970 g/cc to densities as low as 0.920 g/cc for some catalyst systems. As 1-hexene is incorporated, the melt index potential of the catalyst system remains essentially unchanged due to the counter-balancing effect of an increase in melt index when 1-hexene is added and a decrease in melt index when the reactor temperature is lowered to prevent swelling.

However, chromium/aluminophosphate catalyst systems respond in a completely different manner. Even though 1-hexene can be added in large amounts, 1-hexene can be incorporated into the polymer only very sparingly. As a result, 1-hexene can have a poisoning effect on chromium/aluminophosphate catalyst systems which can decrease catalyst system activity and cause the melt index to rise excessively, often out of control.

These effects are demonstrated in Table III, below, and FIGS. 1 and 2. This data was obtained from the 23 gallon loop reactor under the conditions described above.

TABLE III

Effect of 1-hexene on chromium/aluminophosphate catalyst systems compared to chromium/silica catalyst systems

| Catalyst System | % Diluent of 1-hexene | Density of Polymer, g/cc | % Relative Activity of Catalyst System |
|---|---|---|---|
| Chromium/Aluminophosphate | | | |
| P/Al = 0.8 | 0.00 | 0.9369 | 100 |
| P/Al = 0.8 | 0.90 | 0.9595 | 59 |
| P/Al = 0.8 | 1.30 | 0.9595 | 55 |
| P/Al = 0.8 | 1.40 | 0.9578 | 52 |
| P/Al = 0.8 | 0.00 | 0.9672 | 100 |
| P/Al = 0.8 | 1.30 | 0.9621 | 52 |
| P/Al = 0.9 | 0.00 | 0.9650 | 100 |
| P/Al = 0.9 | 2.00 | 0.9640 | 41 |
| P/Al = 0.9 | 3.90 | 0.9605 | 36 |
| P/Al = 0.3 | 0.00 | 0.9597 | 100 |
| P/Al = 0.3 | 1.80 | 0.9567 | 36 |
| P/Al = 0.3 | 3.65 | 0.9538 | 42 |
| P/Al = 0.4 | 0.00 | 0.9610 | 100 |
| P/Al = 0.4 | 4.00 | 0.9544 | 49 |
| Chromium/Silica | | | |
| | 0.00 | 0.965 | 100 |
| | 1.00 | 0.952 | 104 |
| | 2.00 | 0.943 | 100 |
| | 3.00 | 0.938 | 96 |
| | 4.00 | 0.934 | 106 |

Figure 2:
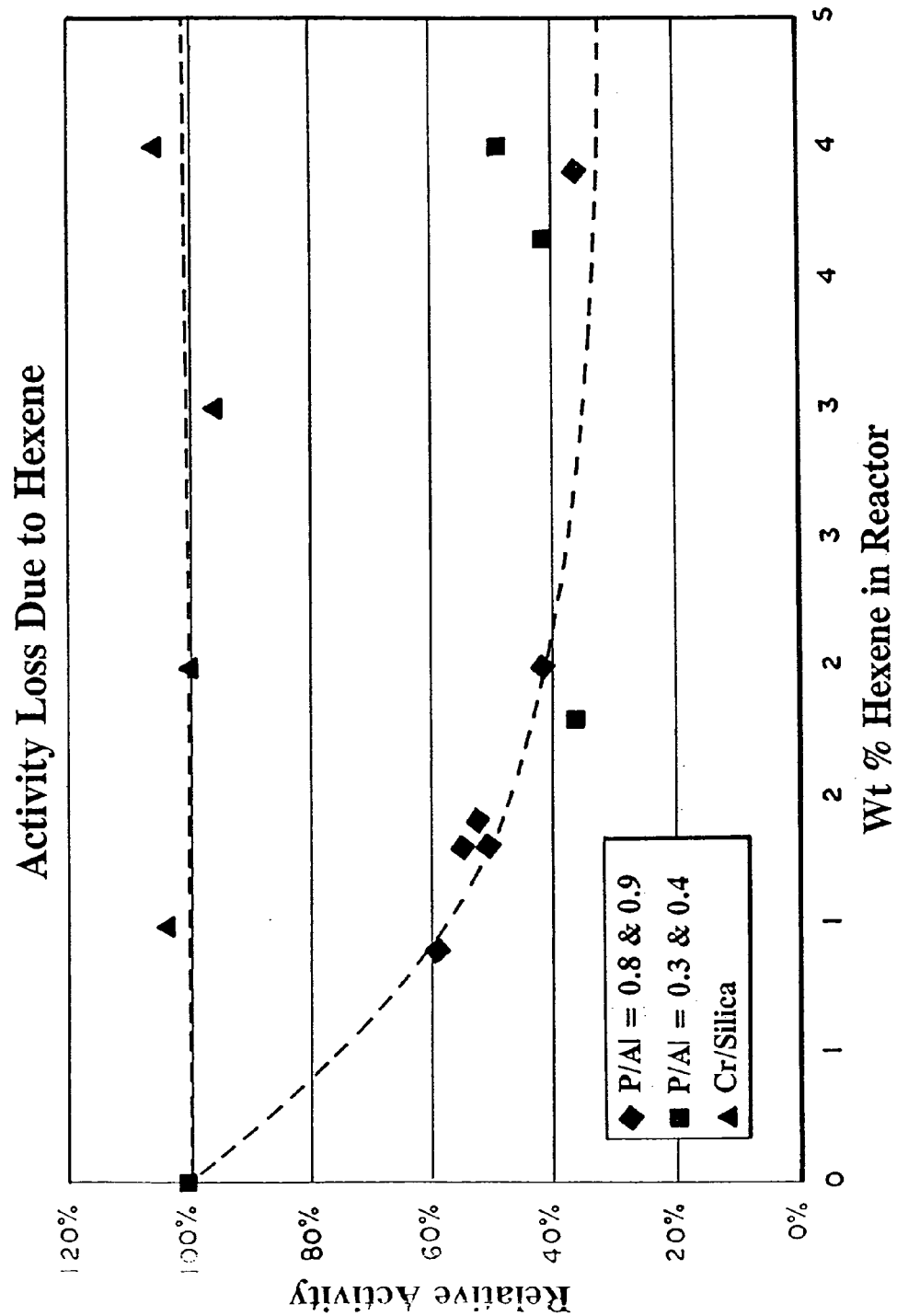
FIG. 2 is a graph of the relative activity of the catalyst system (g/g/h) vs. weight percent 1-hexene in the reactor.

As Table III, and FIGS. 1 and 2 illustrate, the decrease in density of the chromium/aluminophosphate catalyst systems is insignificant as 1-hexene is added, which is illustrative of the poor catalyst system activity. Even at large amounts of 1-hexene, i.e., up to 4 percent of the diluent, the density drop is still minimal. As Table III and FIGS. 1 and 2 represent, producing copolymers using typical chromium/aluminophosphate catalyst systems is problematic at best and certainly cannot produce copolymers with densities of about 0.955 g/cc and below.

Example IV

This example illustrates the procedures of this invention and its effectiveness on the polymerization process and the resultant polymer.

Inventive Examples A–M

Examples A–M demonstrate the effectiveness of the procedures of this invention. These examples, listed in Table IV, were prepared in the 23 gallon loop reactor described above using chromium/aluminophosphate catalyst systems (designated as $AlPO_4$ in the table) having a P/Al molar ratio of 0.2, which were further impregnated with 2% and 2.64% fluoride, as indicated (present in an effective amount of ammonium bifluoride). The catalyst systems were activated at a temperature of 1000° F. (538° C.) and 1100° F. (594° C.) as indicated, and run with 0 to about 2 ppm TEB cocatalyst, as indicated in the table.

As shown in Table IV, examples A–M have HLMI values at desired processing ranges of 5 to 10 g/10 minutes, densities ranging from 0.945–0.951 g/cc, and PENT ESCR values ranging from greater than 1950 hours to greater than 2091 hours. In all cases the PENT ESCR tests were stopped as the time approached 2000 hours, not because of sample failures, but in order to free the testing station for other work. The high PENT ESCR values associated with examples A–M was accomplished without excessively low HLMI values and at rather high densities, in one case at a density of 0.9516 g/cc. In addition, as shown in Table IV, examples H–M have weight average molecular weight distributions ($M_w/M_n$) ranging from 98 to 108, well above the comparative examples.

Carbon monoxide reduction can optionally be used in accordance with the procedures of this invention to improve 1-hexene incorporation. It can be seen in examples F and G the effects that carbon monoxide reduction can have on the resultant polymer. Although HLMI values of examples F and G are below the desired range, as shown in Table IV, copolymers were produced in accordance with this invention, even in the absence of carbon monoxide reduction.

TABLE IV

PENT ESCR values for selected pipe resins

| Run | Catalyst System | Fluoride Level (wt % F.) | Activation Temperature (° F.) | CO reduction (700° F.) | Cocatalyst (Conc ppm) | HLMI (g/10 min) | Density (g/cc) | ESCR (2.54 MPa) | $M_w$ (×1000) | $M_n$ (×1000) | $M_w/M_n$ |
|---|---|---|---|---|---|---|---|---|---|---|---|
| A | $Cr/ALPO_4$ = 0.2 | 2% | 1000° F. | No | TEB (2.05) | 7.53 | 0.9505 | >1950 | — | — | — |
| B | $Cr/ALPO_4$ = 0.2 | 2% | 1000° F. | No | TEB (1.32) | 7.77 | 0.9491 | >1957 | — | — | — |
| C | $Cr/ALPO_4$ = 0.2 | 2% | 1000° F. | No | TEB (1.16) | 4.14 | 0.9484 | >1966 | — | — | — |
| D | $Cr/ALPO_4$ = 0.2 | 2% | 1100° F. | No | TEB (1.5) | 10.82 | 0.9496 | >2035 | — | — | — |
| E | $Cr/ALPO_4$ = 0.2 | 2% | 1100° F. | No | TEB (1.77) | 9.13 | 0.9455 | >2091 | — | — | — |
| F | $Cr/ALPO_4$ = 0.2 | 2% | 1100° F. | Yes | — | 4.37 | 0.9481 | >1562 | — | — | — |
| G | $Cr/ALPO_4$ = 0.2 | 2% | 1100° F. | Yes | — | 2.68 | 0.9456 | >2006 | — | — | — |

TABLE IV-continued

PENT ESCR values for selected pipe resins

| Run | Catalyst System | Fluoride Level (wt % F.) | Activation Temperature (° F.) | CO reduction (700° F.) | Cocatalyst (Conc ppm) | HLMI (g/10 min) | Density (g/cc) | ESCR (2.54 MPa) | $M_w$ (×1000) | $M_n$ (×1000) | $M_w/M_n$ |
|---|---|---|---|---|---|---|---|---|---|---|---|
| H | Cr/ALPO$_4$ = 0.2 | 2.64% | 1100° F. | No | TEB (1) | 4.8 | 0.9494 | >2000 | 718 | 6900 | 104 |
| I | Cr/ALPO$_4$ = 0.2 | 2.64% | 1100° F. | No | TEB (1) | 6.0 | 0.9496 | >2000 | 679 | 6900 | 98 |
| J | Cr/ALPO$_4$ = 0.2 | 2.64% | 1100° F. | No | TEB (1) | 7.9 | 0.9512 | >2000 | 714 | 6800 | 105 |
| K | Cr/ALPO$_4$ = 0.2 | 2.64% | 1100° F. | No | TEB (1) | 5.3 | 0.9492 | >2000 | 740 | 6900 | 107 |
| L | Cr/ALPO$_4$ = 0.2 | 2.64% | 1100° F. | No | TEB (1) | 6.2 | 0.9507 | >2000 | 702 | 6500 | 108 |
| M | Cr/ALPO$_4$ = 0.2 | 2.64% | 1100° F. | No | TEB (1) | 7.5 | 0.9516 | >2000 | 724 | 6900 | 105 |
| 10 | 963 Magnapore | — | 1200° F. | No | — | 10.31 | 0.9443 | 64 | 173.45 | 17.85 | 9.72 |
| 11 | 964 Magnapore | — | 1200° F. | No | TEB (2.05) | 11.28 | 0.9457 | 194 | 234.95 | 10.25 | 22.92 |
| 12 | 963 Magnapore | — | 1000° F. | Yes | TEB (3.12) | 5.21 | 0.9495 | 113 | | | |
| 13 | 963 Magnapore | — | 1200° F. | Yes | TEB (0.8) | 10.52 | 0.9436 | 51 | | | |
| 14 | 963 Magnapore | — | 1000° F. | No | TEB (6) | 8.4 | 0.9511 | 250 | 554 | 8200 | 68 |
| 15 | 963 Magnapore | — | 1000° F. | No | TEB (6) | 4.7 | 0.9504 | 374 | 564 | 8200 | 69 |
| 16 | 963 Magnapore | — | 1000° F. | No | TEB (6) | 4.3 | 0.9507 | 281 | 571 | 7700 | 74 |
| 17 | 965 Sylopore | — | 1100° F. | No | TEB (1.75) | 3.91 | 0.9486 | 52 | | | |
| 18 | 969 MS | — | 1100° F. | No | TEB (2.15) | 12.37 | 0.9435 | 356 | 254.94 | 12.81 | 19.9 |
| 19 | Cr/AlPO$_4$ = 0.3 | — | 1100° F. | Yes | TEB (1) | 21.44 | 0.9463 | 17 | 257.14 | 8.99 | 28.59 |
| 20 | Cr/AlPO$_4$ = 0.3 | — | 1100° F. | Yes | TEB (1) | 15.54 | 0.9507 | 37 | | | |
| 21 | Cr/AlPO$_4$ = 0.6 | — | 1100° F. | Yes | — | 13.25 | 0.9432 | 143 | 259.02 | 11.03 | 23.48 |
| 22 | Cr/AlPO$_4$ = 0.6 | — | 1100° F. | Yes | — | 12.57 | 0.9440 | 166 | 170.6 | 9.5 | 17.95 |

*Weight average molecular weight ($M_w$), number average molecular weight ($M_n$), and polydispersity ($M_w/M_n$) was determined by SEC method (not coupled with FTIR).

Comparative Examples 10–18

Also shown in Table IV are similar pipe resins made under similar conditions, but using conventional catalyst systems. Notice that example 10, made from a Magnapore chromium/silica-titania catalyst system yielded a density much lower than desired and the PENT ESCR value was excessively low compared to the inventive examples described above. Although example 10 did not employ a triethylboron cocatalyst, known to broaden the molecular weight distribution of chromium/silica-titania catalyst systems, examples 11–16 did employ a triethylboron cocatalyst. However, even with the addition TEB, it can be seen from Table IV that the PENT ESCR value did improve, but the results were still inferior compared to the inventive examples. Also, in examples 12, and 14–16 it can be seen the benefits that can be gained by using a lower activation temperature, in this case 1000° F. instead of 1200° F. Although examples 12, 14–16 yielded high densities, the PENT ESCR values were poor in comparison to the inventive examples.

Also, example 17 used a triethylboron cocatalyst with a lower porosity chromium/silica-titania catalyst system, but again the PENT ESCR value was very low, even at the excessively low HLMI of 3.9 g/10 minutes. Even when a chromium/silica catalyst system was used instead of chromium/silica-titania catalyst system as shown in example 18, the benefits were minimal. Although the PENT ESCR value for the chromium/silica catalyst system was greater than the other chromium/silica-titania catalyst systems, it was still very low compared to the inventive examples.

Comparative Examples 19–22

The low PENT ESCR values in examples 19–22 show that not any chromium/aluminophosphate catalyst system can be used, only those described in accordance with this invention. In these examples, chromium/aluminophosphate catalyst systems were made as described above, and were run according to the same conditions used in inventive examples A–M, but the P/Al molar ratio was varied. In examples 19 and 20, the P/Al molar ratio was raised to 0.3, only slightly above the 0.2 molar ratio used in examples A–M. As shown in examples 21 and 22, the P/Al molar ratio was increased to 0.6, but again this resulted in low PENT ESCR values, even at the unacceptable low density obtained. As the data in Table IV demonstrate, the PENT ESCR value suffered considerably when the P/Al molar ratio was increased much above 0.2. However, lower levels of P/Al molar ratios also can be unacceptable, since the catalyst system activity decreases substantially.

Example V

This example illustrates the effect of fluoride on the catalyst systems used in accordance with this invention. It is generally known that fluoride improves activity for catalyst systems containing alumina, but its effects on density have not been previously known. In this example, chromium/aluminophosphate catalyst systems were made as described above, but impregnated with different amounts of fluoride. Two P/Al molar ratios were chosen, one high (P/Al=0.6), and one low (P/Al=0.2) to illustrate fluoriding effects on density. Catalyst systems were activated at 1200° F. (649° C.) and polymers were produced in the 23 gallon loop reactor as described above using about 1 ppm triethylboron (TEB) cocatalyst. The results are described in Table VII below.

TABLE VII

Effect of fluoride on polymer as indicated by density of polymer at P/Al molar ratios of 0.2 and 0.6

| | Density of Polymer | |
|---|---|---|
| Percent Fluoride added | P/Al = 0.2 | P/Al = 0.6 |
| 0.00% | 0.9582 | 0.9647 |
| 0.34% | 0.9573 | n/a |
| 0.67% | 0.9565 | 0.9625 |
| 1.34% | 0.9547 | 0.9605 |

TABLE VII-continued

Effect of fluoride on polymer as indicated by density of polymer at P/Al molar ratios of 0.2 and 0.6

| | Density of Polymer | |
|---|---|---|
| Percent Fluoride added | P/Al = 0.2 | P/Al = 0.6 |
| 2.01% | 0.9538 | 0.9600 |
| 2.68% | 0.9539 | n/a |

As the data in Table VII demonstrate, as fluoride was added to the catalyst systems, it was observed that the natural density of the polymers decreased. As shown in Table VII, most of the effect on density occurred by about 2 percent $NH_4HF_2$ addition (1.34% F), but small decreases in density were visible at increased fluoride percentages, both at P/Al molar ratios of 0.2 and 0.6. Natural lowering of density is very helpful for Chromium/aluminophosphate catalyst systems because, as stated above, chromium aluminophosphate catalyst systems have a tendency to be poisoned by 1-hexene comonomer which would ordinarily be used to lower density.

However, as shown in Table VIII below, adding too much fluoride can be detrimental.

TABLE VIII

Effect of Fluoride on catalyst system activity

| % F | Grams of Catalyst system charged (g cat) | Grams of polymer obtained (g pol) | Time (min) | Activity (g pol/g cat/h)) |
|---|---|---|---|---|
| 0.00% | 0.06 | 138.3 | 60.0 | 2305 |
| 2.68% | 0.0487 | 132.5 | 53.3 | 3063 |
| 4.00% | 0.0376 | 73.0 | 61.2 | 1903 |
| 4.00% | 0.0950 | 213.0 | 62.5 | 2152 |
| 4.00% | 0.0686 | 132 | 60.5 | 1908 |

The data in Table VIII were obtained from polymers made using the bench reactor with 8 ppm TEB cocatalyst, under conditions described above. Chromium/aluminophosphate catalyst systems were made as described above at a P/Al molar ratio of 0.2 and at an activation temperature of 1100° F. (593° C.), except that the level of ammonium bifluoride was varied. As the data in Table VIII indicate, although initially fluoride enhanced the catalyst system activity, 6 percent $NH_4HF_2$ (4% F) appeared to impair catalyst system activity. Although the precise optimum level of fluoride will vary somewhat with activation temperature, surface area, and other factors, etc., it would appear that the optimum level would be in the general range of about 2 to about 4 percent $NH_4HF_2$ (1.34–2.68% F) or the equivalent thereto of some other fluoride source.

Example VI

This example illustrates the preferred use of cocatalyst(s) in the present invention. Since low P/Al molar ratios and low activation temperatures are preferred in chromium/aluminophosphate catalyst systems for improved polymer properties, the catalyst systems naturally exhibit low activity, especially if 1-hexene is added to make copolymers. Thus, the use of cocatalyst(s) to improve catalyst system activity is particularly effective for chromium/aluminophosphate catalyst systems. Preferably, in accordance with the procedures of this invention, a cocatalyst(s) is present in the reactor in a concentration in the range of from about 0.3 to 10 ppm. In this example, aluminophosphate catalyst systems were prepared according to the procedure described above at a temperature of 1200° F. (649° C.) and used with various cocatalysts as indicated in Table IX below. The cocatalyst effect on catalyst system activity is noted.

TABLE IX

Cocatalyst Effect

| Cocatalyst | Concentration (ppm) | Activity (g pol/g cat/h) |
|---|---|---|
| None | | 1725 |
| BEt3 | 4 | 3920 |
| BEt3 | 8 | 4400 |
| BEt3 | 16 | 1930 |
| BBu3 | 4 | 5590 |
| BBu3 | 8 | 6264 |
| BBu3 | 16 | 5735 |
| BBu3 | 24 | 1055 |
| BPh3 | 8 | 1290 |
| AlEt3 | 4 | 1885 |
| AlEt3 | 8 | 1720 |
| AlEt3 + BEt3 | 4 & 4 | 6855 |
| ZnEt2 | 8 | 1945 |
| AlEt2Cl | 4 | 1790 |
| AlEt2Cl | 8 | 1450 |
| AlEt2Cl | 8 | 1065 |
| MgBu2 | 8 | 1670 |
| LiBu | 4 | 1540 |
| LiBu | 8 | 1280 |
| AlEt2OEt | 8 | 1210 |
| BEtCl2 | 8 | 505 |
| NaBPh4 | 4 | 850 |
| NaBPh4 | 8 | 2130 |
| NaBPh4 | 32 | 260 |
| LiBBu4 | 4 | 1957 |
| SbBu3 | 16 | 685 |
| SbPh3 | 16 | 1730 |
| Sn2Bu6 | 15 | 2090 |
| Et3SiOAlEt2 | 8 | 3125 |
| GeBu4 | 16 | 0 |
| Ph3SiOBEt2 | 16 | 0 |

Et = Ethyl;
Bu = Butyl;
Ph = Phenyl

As the data in Table IX demonstrate, trialkylboron compounds as cocatalyst was effective in its effect on catalyst system activity as well as trialkylsiloxyaluminum compounds. Combinations of triethylboron and triethylaluminum compounds were also effective on catalyst system activity. In some cases, the combination of triethylboron and triethylaluminum compounds as cocatalyst(s) exhibited higher catalyst system activity than either compound alone.

Example VII

Figure 3:
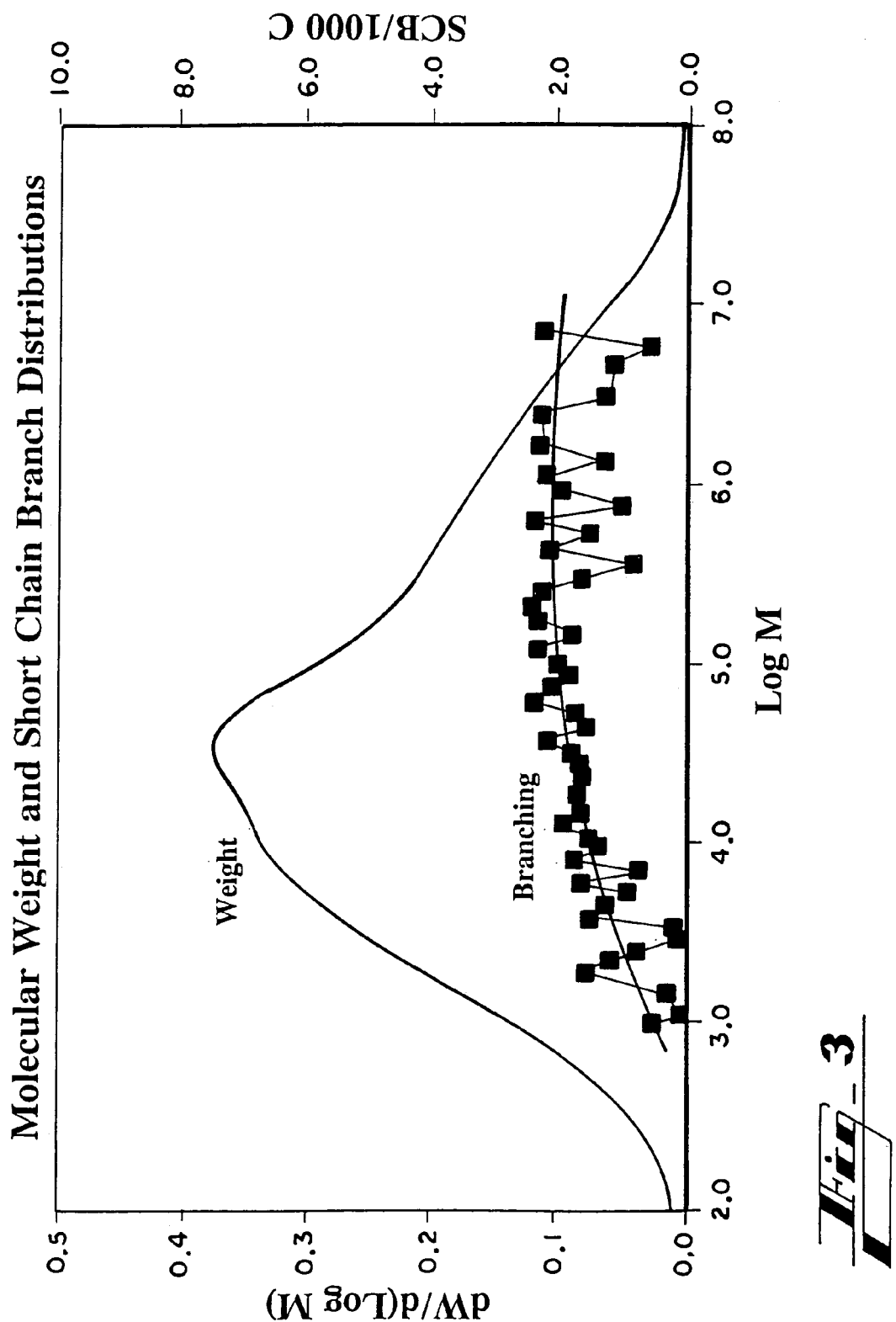
FIG. 3 is a graph of short chain branch distributions (SCB/1000 total carbons) of a polymer given in Example VII vs. molecular weight (Log M).

This example illustrates the molecular weight distribution of polymers produced in accordance with this invention. To obtain this distribution, a chromium/aluminophosphate catalyst system with a P/Al molar ratio of 0.2 and 4 weight percent ammonium bifluoride was prepared by the method described above and activated at 1100° F. (649° C.). Triethylboron was used as cocatalyst at 2.1 ppm. The resultant polymer was produced in the 23 gallon loop reactor as described above and had a HLMI of 6.75 g/10 minutes and a density of 0.9485 g/cc. A branch profile analysis of this polymer displaying the branching and molecular weight distribution is shown in FIG. 3.

Ordinarily, chromium based catalyst systems tend to incorporate comonomers into the low molecular weight portion of the distribution. This can be undesirable since desirable properties can be found in distributions containing branching in the largest chains, since these can serve as tie molecules between crystallines. Remarkably, FIG. 3 demonstrates that the catalyst systems of this invention produce polymers where the branching tends to be weighted toward the high molecular weight end, which is where the superior PENT ESCR values can be found. Also, FIG. 3 demonstrates the extremely broad molecular weight distribution of polymers produced in accordance with this invention. The weight average molecular weight ($M_w$) was 759,000 while the number average molecular weight ($M_n$) was 4310, giving a polydispersity breadth ($M_w/M_n$) of 176.3, as determined by SEC-FTIR Branch Determination method.

The invention claimed is:

1. A catalyst composition comprising a contact product of:
   (a) a catalyst system comprising a contact product of:
      (i) an aluminophosphate support having a phosphorus to aluminum molar ratio of less than about 0.28;
      (ii) a source of chromium; and
      (iii) a source of fluoride,
   wherein the catalyst system is calcined at a temperature of less than about 700° C., the calcined catalyst system having a surface area from about 300 to about 1000 square meters/g, and
   (b) at least one cocatalyst system selected from:
      (i) at least one trialkylsiloxyaluminum compound; or
      (ii) a combination of at least one trialkylboron compound and at least one trialkylaluminum compound.

2. The composition of claim 1, wherein the calcined catalyst system has a pore volume of greater than about 1.5 cc/g.

3. The composition of claim 1, wherein the source of chromium is chromium (VI) trioxide, chromium (III) acetate, chromium (III) nitrate, or any combination thereof.

4. The composition of claim 1, wherein the source of fluoride is hydrofluoric acid, ammonium fluoride, ammonium bifluoride, ammonium fluoroborate, ammonium silicofluoride, ammonium fluorophosphate, ammonium hexafluorotitanate, ammonium hexafluorozirconate, or any combination thereof.

5. The composition of claim 1, wherein the at least one trialkylboron compound is trimethylborane, triethylborane, tri-n-butyl borane, tributylborane, tripropylborane, triphenylborane, tribenzylborane, or any combination thereof.

6. The composition of claim 1, wherein the at least one trialkylaluminum compound is trimethylaluminum, triethylaluminum, tributylaluminum, or any combination thereof.

7. The composition of claim 1, wherein the at least one trialkylsiloxyaluminum compound is trimethylsiloxyaluminum diethyl, triethylsiloxyaluminum diethyl, tripropylsiloxyaluminum dimethyl, or any combination thereof.

8. The composition of claim 1, wherein the at least one trialkylboron compound is triethylboron, the at least one trialkylaluminum compound is triethylaluminum, and the at least one trialkylsiloxyaluminum compound is triethylsiloxyaluminum diethyl.

9. The composition of claim 1, wherein the aluminophosphate support has a phosphorus to aluminum molar ratio from about 0.1 to about 0.25.

10. The composition of claim 1, wherein the catalyst system comprises from about 0.1 to about 5 weight percent chromium, based on the weight of the support.

11. The composition of claim 1, wherein the catalyst system comprises from about 0.3 to about 7 weight percent fluoride, based on the weight of the support.

12. The composition of claim 1, wherein the catalyst system is calcined at a temperature from about 500° C. to about 650° C.

13. A composition comprising:
   (a) a catalyst system comprising an aluminophosphate support having a phosphorus to aluminum molar ratio of less than about 0.28, and
   from about 0.1 to about 5 weight percent chromium;
   wherein the catalyst system is treated with fluoride and calcined, the calcined catalyst system having a surface area from about 300 to about 1000 square meters/g; and
   (b) at least one cocatalyst system selected from:
      (i) at least one trialkylsiloxyaluminum compound; or
      (ii) a combination of at least one trialkylboron compound and at least one trialkylaluminum compound, diethylaluminum chloride, or any combination thereof.

14. A composition comprising:
   (a) a catalyst system comprising an aluminophosphate support having a phosphorus to aluminum molar ratio of less than about 0.28, and
   from about 0.1 to about 5 weight percent chromium;
   wherein the catalyst system is treated with fluoride and calcined, the calcined catalyst system having a surface area from about 300 to about 1000 square meters/g; and
   (b) at least one cocatalyst system selected from:
      (i) at least one trialkylsiloxyaluminum compound; or
      (ii) a combination of at least one trialkylboron compound and at least one trialkylaluminum compound.

15. The composition of claim 14, wherein the amount of fluoride on the support is less than about 7 weight percent fluoride, based on the weight of the support.

16. The composition of claim 14, wherein the catalyst system is calcined at a temperature of less than about 700° C.

17. The composition of claim 14, wherein the calcined catalyst system has a pore volume of greater than about 1.5 cc/g.

18. A composition comprising:
   (a) a catalyst system comprising an aluminophosphate support having a phosphorus to aluminum molar ratio of less than about 0.28, and
   from about 0.1 to about 5 weight percent chromium;
   wherein the catalyst system is treated with less than about 7 weight percent fluoride and calcined at a temperature of less than about 700° C., and wherein the calcined catalyst system has a surface area from about 300 to about 1000 square meters/g and a pore volume of greater than about 1.5 cc/g; and
   (b) at least one cocatalyst system selected from:
      (i) at least one trialkylsiloxyaluminum compound; or
      (ii) a combination of at least one trialkylboron compound and at least one trialkylaluminum compound.

19. The composition of claim 18, wherein the at least one trialkylboron compound is trimethylborane, triethylborane, tri-n-butyl borane, tributylborane, tripropylborane, triphenylborane, tribenzylborane, or any combination thereof.

20. The composition of claim 18, wherein the at least one trialkylaluminum compound is trimethylaluminum, triethylaluminum, tributylaluminum, or any combination thereof.

21. The composition of claim 18, wherein the at least one trialkylsiloxyaluminum compound is trimethylsiloxyaluminum diethyl, triethylsiloxyaluminum diethyl, tripropylsiloxyaluminum dimethyl, or any combination thereof.

22. The composition of claim 18, wherein the aluminophosphate support has a phosphorus to aluminum molar ratio from about 0.1 to about 0.25.

23. The composition of claim 18, wherein the catalyst system comprises from about 0.8 to about 1.5 weight percent chromium, based on the weight of the support.

24. The composition of claim 18, wherein the catalyst system is treated with from about 0.7 to about 4 weight percent fluoride, based on the weight of the support.

25. The composition of claim 18, wherein the catalyst system is calcined at a temperature from about 500° C. to about 650° C.

26. The composition of claim 18, wherein the calcined catalyst system has a surface area from about 400 to about 800 square meters/g and a pore volume of greater than about 1.8 cc/g.

27. A composition comprising:
(a) a catalyst system comprising an aluminophosphate support having a phosphorus to aluminum molar ratio from about 0.15 to about 0.25, and from about 0.8 to about 1.5 weight percent chromium;
wherein the catalyst system is treated with less than about 7 weight percent fluoride and calcined at a temperature of less than about 700° C., and wherein the calcined catalyst system has a surface area from about 300 to about 1000 square meters/g and a pore volume of greater than about 1.5 cc/g; and
(b) at least one cocatalyst system selected from:
(i) at least one trialkylsiloxyaluminum compound; or
(ii) a combination of at least one trialkylboron compound and at least one trialkylaluminum compound.

28. The composition of claim 27, wherein the at least one trialkylboron compound is trimethylborane, triethylborane, tri-n-butyl borane, tributylborane, tripropylborane, triphenylborane, tribenzylborane, or any combination thereof.

* * * * *

UNITED STATES PATENT AND TRADEMARK OFFICE
CERTIFICATE OF CORRECTION

| | | |
|---|---|---|
| PATENT NO. | : 7,208,441 B2 | Page 1 of 1 |
| APPLICATION NO. | : 10/997727 | |
| DATED | : April 24, 2007 | |
| INVENTOR(S) | : Elizabeth A. Benham et al. | |

It is certified that error appears in the above-identified patent and that said Letters Patent is hereby corrected as shown below:

On the Title Page, item 73 assignee, replace "Chevron Philips Chemical Company LP" with -- Chevron Phillips Chemical Company LP --

Signed and Sealed this

Twentieth Day of November, 2007

JON W. DUDAS
*Director of the United States Patent and Trademark Office*